US010443513B2

(12) United States Patent
Niiyama et al.

(10) Patent No.: US 10,443,513 B2
(45) Date of Patent: Oct. 15, 2019

(54) EMERGENCY SHUTOFF DEVICE AND EMERGENCY SHUTOFF SYSTEM PROVIDED WITH SAME

(71) Applicant: MITSUBISHI HEAVY INDUSTRIES COMPRESSOR CORPORATION, Tokyo (JP)

(72) Inventors: Takashi Niiyama, Hiroshima (JP); Ken Nishitani, Hiroshima (JP); Hirokazu Kawashima, Hiroshima (JP); Abhay Jain, Hiroshima (JP)

(73) Assignee: MITSUBISHI INDUSTRIES COMPRESSOR CORPORATION, Tokyo (JP)

( * ) Notice: Subject to any disclaimer, the term of this patent is extended or adjusted under 35 U.S.C. 154(b) by 217 days.

(21) Appl. No.: 15/528,954

(22) PCT Filed: Nov. 26, 2014

(86) PCT No.: PCT/JP2014/081142
§ 371 (c)(1),
(2) Date: May 23, 2017

(87) PCT Pub. No.: WO2016/084140
PCT Pub. Date: Jun. 2, 2016

(65) Prior Publication Data
US 2017/0268432 A1    Sep. 21, 2017

(51) Int. Cl.
*F16K 11/14*        (2006.01)
*F02C 9/46*         (2006.01)
(Continued)

(52) U.S. Cl.
CPC ............... *F02C 9/46* (2013.01); *F01D 17/20* (2013.01); *F01D 17/26* (2013.01); *F01D 21/003* (2013.01);
(Continued)

(58) Field of Classification Search
CPC .......... F02C 9/46; F01D 17/26; F01D 21/003; F01D 21/18; F01L 31/02; F16K 17/082;
(Continued)

(56) References Cited

U.S. PATENT DOCUMENTS 3,189,050 A * 6/1965 Heckmann .......... F15B 13/0402
                                                137/625.63
4,188,974 A * 2/1980 Roger .................... F16K 11/065
                                                137/557

(Continued)

FOREIGN PATENT DOCUMENTS

JP            10-131711 A    5/1998

OTHER PUBLICATIONS

International Search Report and Written Opinion of the International Searching Authority (Forms PCT/ISA/210 and PCT/ISA/237), dated Mar. 10, 2015, for International Application No. PCT/JP2014/081142, including English translations.

*Primary Examiner* — Reinaldo Sanchez-Medina
(74) *Attorney, Agent, or Firm* — Birch, Stewart, Kolasch & Birch, LLP

(57) ABSTRACT

The emergency shutoff device is provided with a casing (21) in which inflow ports (22) through which control oil flows into a space (A1) provided therein and a plurality of outflow ports (23) through which the control oil flows outside of the space (A1) are formed; and a switching unit (24) configured to slide along an inner circumferential surface of the casing (21) in which the space (A1) is formed, to change its position relative to the plurality of outflow ports (23), and thus to switch a circulation state of the control oil in the space (A1). The switching unit (24) switches the circulation state between the first circulation state in which the control oil is circulated from a first inflow port (221) to a first outflow port (231) and the third circulation state in which an open and closed state of a test outflow port (236) is switched while the
(Continued)

control oil is being circulated from the first inflow port (221) to the first outflow port (231).

7 Claims, 7 Drawing Sheets

(51) Int. Cl.
| | |
|---|---|
| *F01D 17/20* | (2006.01) |
| *F01L 31/00* | (2006.01) |
| *F16K 17/36* | (2006.01) |
| *F01D 17/26* | (2006.01) |
| *F01D 21/00* | (2006.01) |
| *F01D 21/18* | (2006.01) |
| *F01D 21/20* | (2006.01) |
| *F15B 19/00* | (2006.01) |
| *F15B 13/04* | (2006.01) |

(52) U.S. Cl.
CPC ............. *F01D 21/18* (2013.01); *F01D 21/20* (2013.01); *F01L 31/00* (2013.01); *F15B 19/00* (2013.01); *F16K 17/363* (2013.01); *F05D 2260/83* (2013.01); *F15B 13/0402* (2013.01)

(58) Field of Classification Search
CPC .... F16K 17/363; F16K 31/02; F16K 31/1221; F16K 31/1223; F16K 31/1225
See application file for complete search history.

(56) References Cited

U.S. PATENT DOCUMENTS

| | | | |
|---|---|---|---|
| 6,763,791 B2 * | 7/2004 | Gardner | ............... F01L 1/34 |
| | | | 123/90.15 |
| 2009/0071545 A1 * | 3/2009 | Xiang | ............ F16H 61/0021 |
| | | | 137/118.02 |

* cited by examiner

EMERGENCY SHUTOFF DEVICE AND EMERGENCY SHUTOFF SYSTEM PROVIDED WITH SAME

TECHNICAL FIELD

The present invention relates to an emergency shutoff device and an emergency shutoff system provided with the same.

BACKGROUND ART

In electric power plants such as nuclear power plants and thermal power plants, petroleum refining, petrochemical plants, and liquefied natural gas (LNG) plants, electricity is generated or power sources of compressors are used by supplying steam generated in plant processes to steam turbines and rotatably driving generators, compressors, and the like coupled to rotors of steam turbines. Turbine trips in which rotation of such steam turbines is quickly stopped are performed on the steam turbines and thus machines are protected in an emergency in which it is difficult to safely operate rotating bodies and plant machines. Turbine trips are performed by closing main steam stop valves provided in supply passages used to supply steam to steam turbines and by cutting off the supply of steam to the steam turbines.

An emergency shutoff device configured to perform such a turbine trip is disclosed, for example, as a turbine emergency device in Patent Document 1. The turbine emergency device disclosed in Patent Document 1 has a plurality of electromagnetic valves and a plurality of master trip valves, which configured to control the supply of control oil to a steam stop valve serving as a main steam stop valve. In such a turbine emergency device, a spool is formed such that a closing port and an oil pressure supply port which are not used during a normal operation communicate with each other at all times in a spool valve constituting a master trip valve.

CITATION LIST

Patent Literature

[Patent Document 1]
Japanese Unexamined Patent Application, First Publication No. H10-131711

SUMMARY OF INVENTION

Technical Problem

However, the emergency shutoff device as described above has a spool type valve structure in which control oil is switched as in Patent Document 1. During a normal operation, internal flow paths of the emergency shutoff device are set so that control oil is supplied to the main steam stop valve. When control oil is supplied from the emergency shutoff device, a valve of the main steam stop valve is set to an open state and steam can be supplied to the steam turbine. At emergency stop, the internal flow paths of the emergency shutoff device are switched to cut off the supply of control oil so that the main steam stop valve is closed.

Therefore, the emergency shutoff device performs a shutoff operation only under limited circumstances such as emergency stop or plant stoppage. However, the emergency shutoff device needs to be necessarily operated at emergency stop even if a frequency of use is low. The emergency shutoff device thus reliability of the emergency shutoff device can be improved if an operation test for checking whether a shutoff operation can be reliably performed can be regularly performed during an operation.

However, it is necessary that the emergency shutoff device continues to supply control oil during a normal operation and an operation test also needs to be performed such that supply of control oil is not stopped. For this reason, countermeasures in which supply of control oil is not stopped such as installation of a plurality of devices connected to each other through pipes or the like and supply through bypass of control oil need to be performed. Thus it is significantly difficult to perform an operation test.

The present invention provides an emergency shutoff device in which an operation test can be easily performed and an emergency shutoff system provided with the same.

Solution to Problem

An emergency shutoff device according to a first aspect of the present invention includes: a casing in which an inflow port through which control oil flows into a space provided therein and a plurality of outflow ports through which the control oil flows outside of the space are formed; and a switching unit configured to slide along an inner circumferential surface of the casing in which the space is formed, to change its position relative to the plurality of outflow ports, and thus to switch a circulation state of the control oil in the space, wherein the casing includes, as the plurality of outflow ports, a first outflow port through which the control oil flowing into the space through the inflow port flows out and the control oil reversely flows into the space, a second outflow port through which the control oil flowing into the space through the inflow port flows out, a discharge port through which the control oil reversely flowing into the space through the first outflow port is discharged, and a test outflow port, an open and closed state of which is switched through the switching unit when an operation test is performed, and wherein the switching unit switches the circulation state between a first circulation state in which the control oil is circulated from the inflow port to the first outflow port, a second circulation state in which the control oil is circulated from the inflow port to the second outflow port and the control oil reversely flowing from the first outflow port is circulated to the discharge port, and a third circulation state in which an open and closed state of the test outflow port is switched while the control oil is being circulated from the inflow port to the first outflow port.

According to such a constitution, when an operation test is performed, a circulation state is switched from the first circulation state to the third circulation state through the switching unit so that an open and closed state of the test outflow port can be switched. Since control oil is circulated from the inflow ports to the first outflow port in the casing even when a circulation is switched from the first circulation to the third circulation state, a circulation state of control oil in the space can be maintained. Therefore, an operation test can be easily performed while a circulation state during a normal operation is maintained without stopping the emergency shutoff device.

According to the emergency shutoff device according to a second aspect of the present invention, in the first aspect, the first outflow port may be connected to a stop valve communicating pipe connected to a stop valve configured to shut off the supply of steam to a steam turbine by discharging the control oil filling an inside thereof, the second outflow port may be connected to a regulating valve communicating pipe connected to a regulating valve configured to adjust a supply amount of steam to the steam turbine, and the discharge port may be connected to a casing discharge pipe configured to discharge the control oil in the space to the outside, and wherein the switching unit may be switched from the first circulation state to the second circulation state when the steam turbine is urgently stopped and is switched from the first circulation state to the third circulation state when an operation test is performed.

According to such a constitution, the first outflow port is connected to the stop valve communicating pipe connected to the stop valve and the second outflow port is connected to the regulating valve communicating pipe connected to a regulating valve. For this reason, they can be used as the mechanical trip device configured to urgently shut off the stop valve or the regulating valve when the steam turbine is urgently stopped.

According to the emergency shutoff device according to a third aspect of the present invention, in the first aspect, the first outflow port may be connected to an internal communicating pipe communicating with an inside of an oil cylinder of a stop valve configured to shut off the supply of steam to a steam turbine by discharging the control oil filling an inside thereof, the second outflow port may be connected to a casing discharge pipe through which the control oil in the space is discharged to the outside, and the discharge port may be connected to a stop valve discharge pipe through which the control oil inside the oil cylinder of the stop valve is discharged to the outside, and wherein the switching unit may be switched from the first circulation state to the second circulation state when the steam turbine is urgently stopped and may be switched from the first circulation state to the third circulation state when an operation test is performed.

According to such a constitution, the first outflow port is connected to the internal communicating pipe communicating with the inside of the stop valve and the second outflow port is connected to the casing discharge pipe. For the reason, they can be used as the TTV trip device configured to urgently discharge control (drive) oil from the inside of the stop valve.

An emergency shutoff system according to a fourth aspect of the present invention includes: a stop valve configured to shut off the supply of steam to a steam turbine by discharging the control oil filling an inside thereof; a regulating valve configured to adjust a supply amount of steam to the steam turbine; and the emergency shutoff device according to the second aspect of the present invention.

According to the emergency shutoff system according to a fifth aspect of the present invention, in the fourth aspect of the present invention, the emergency shutoff system may include the emergency shutoff device according to the third aspect of the present invention.

According to such a constitution, the emergency shutoff system can be easily constituted using the emergency shutoff device in which the casing is formed in a simple structure in which the switching unit is merely switched.

According to the emergency shutoff system according to a sixth aspect of the present invention, in the fourth aspect of the present invention, a plurality of emergency shutoff devices according to the second aspect of the present invention may be arranged in parallel.

According to the emergency shutoff system according to a seventh aspect of the present invention, in the fifth aspect of the present invention, a plurality of emergency shutoff devices according to the third aspect of the present invention may be arranged in parallel.

According to such a constitution, the plurality of emergency shutoff devices are arranged in parallel so that redundancy can be provided. For this reason, even when one of the emergency shutoff devices has failed, control oil can be supplied via another emergency shutoff device of the emergency shutoff devices which have not failed. In addition, a turbine can be tripped via an emergency shutoff device which has not failed in an emergency. Thus, the steam turbine can be stably operated without stopping the steam turbine due to a failure of the emergency shutoff system.

Advantageous Effects of Invention

According to the above-described emergency shutoff device, a circulation state is switched to the third circulation state through the switching unit at the time of an operation test so that an operation test can be easily performed by switching an open and closed state of the test outflow port while control oil is being circulated from the inflow ports to the first outflow port.

DESCRIPTION OF EMBODIMENTS

Hereinafter, an embodiment in the present invention will be described with reference to FIGS. 1 to 7.

Figure 1:
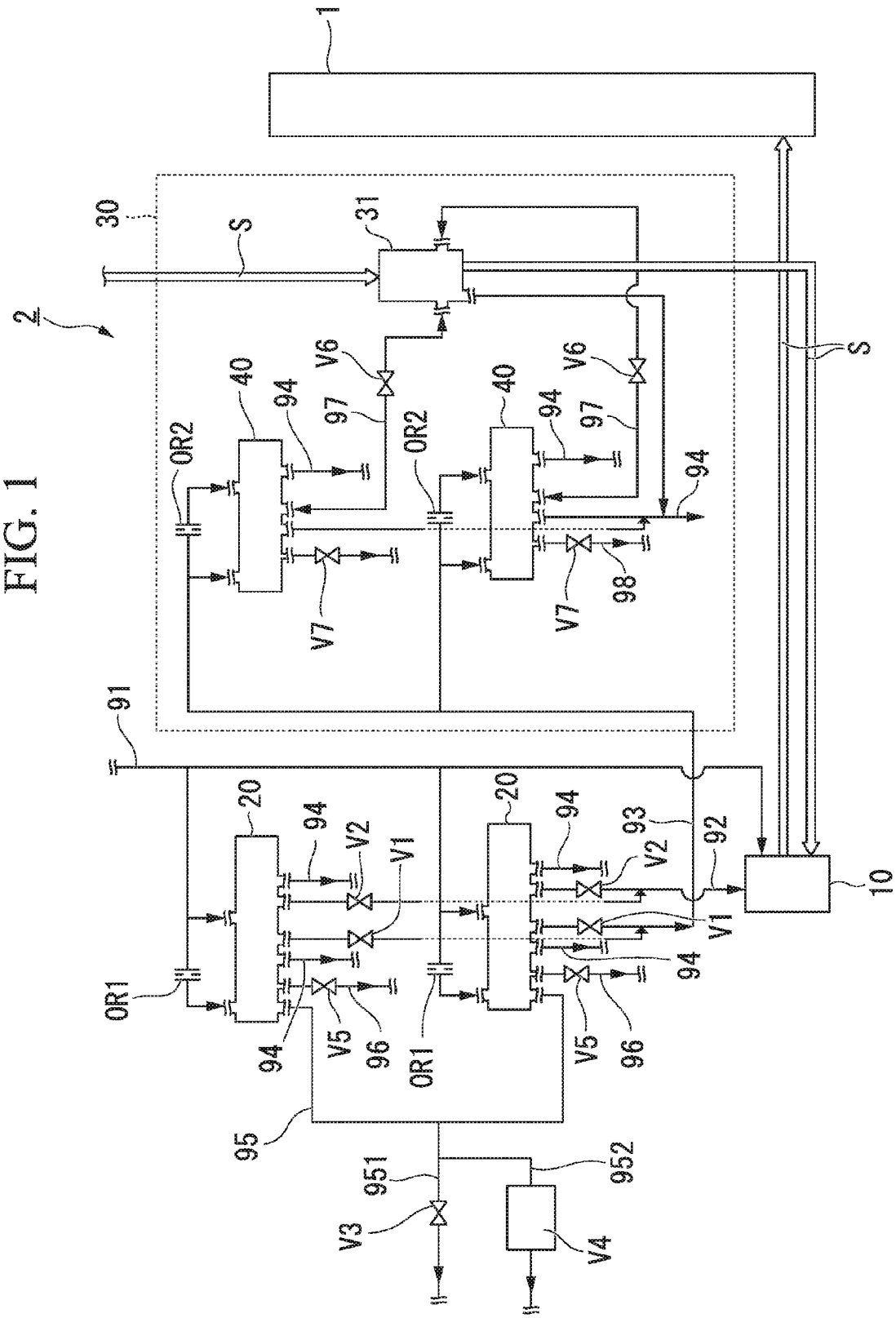
FIG. 1 is a schematic diagram illustrating an emergency shutoff system in an embodiment of the present invention.
Figure 2:
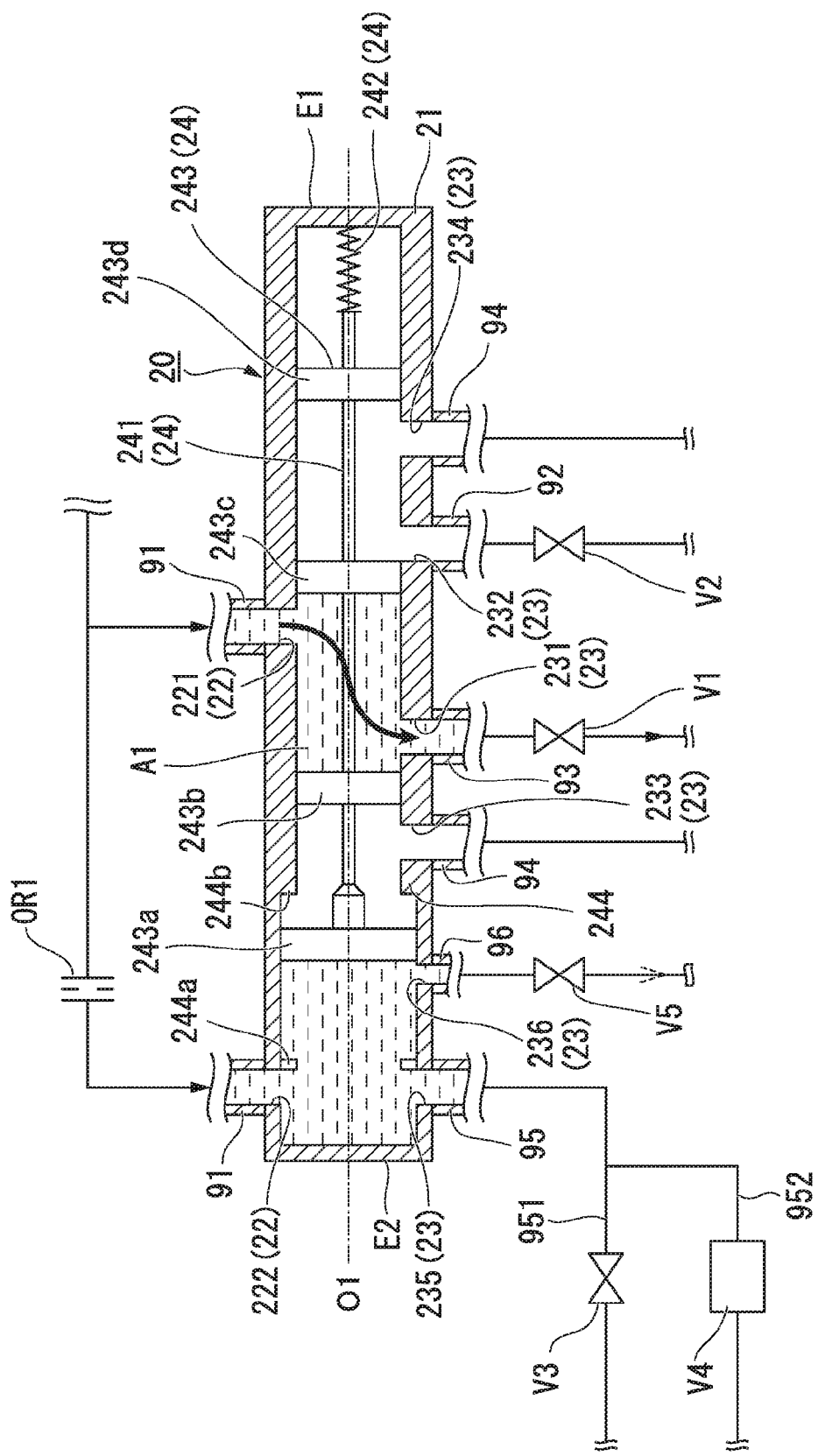
FIG. 2 is a schematic diagram illustrating a trip device during a normal operation in the embodiment of the present invention.
Figure 3:
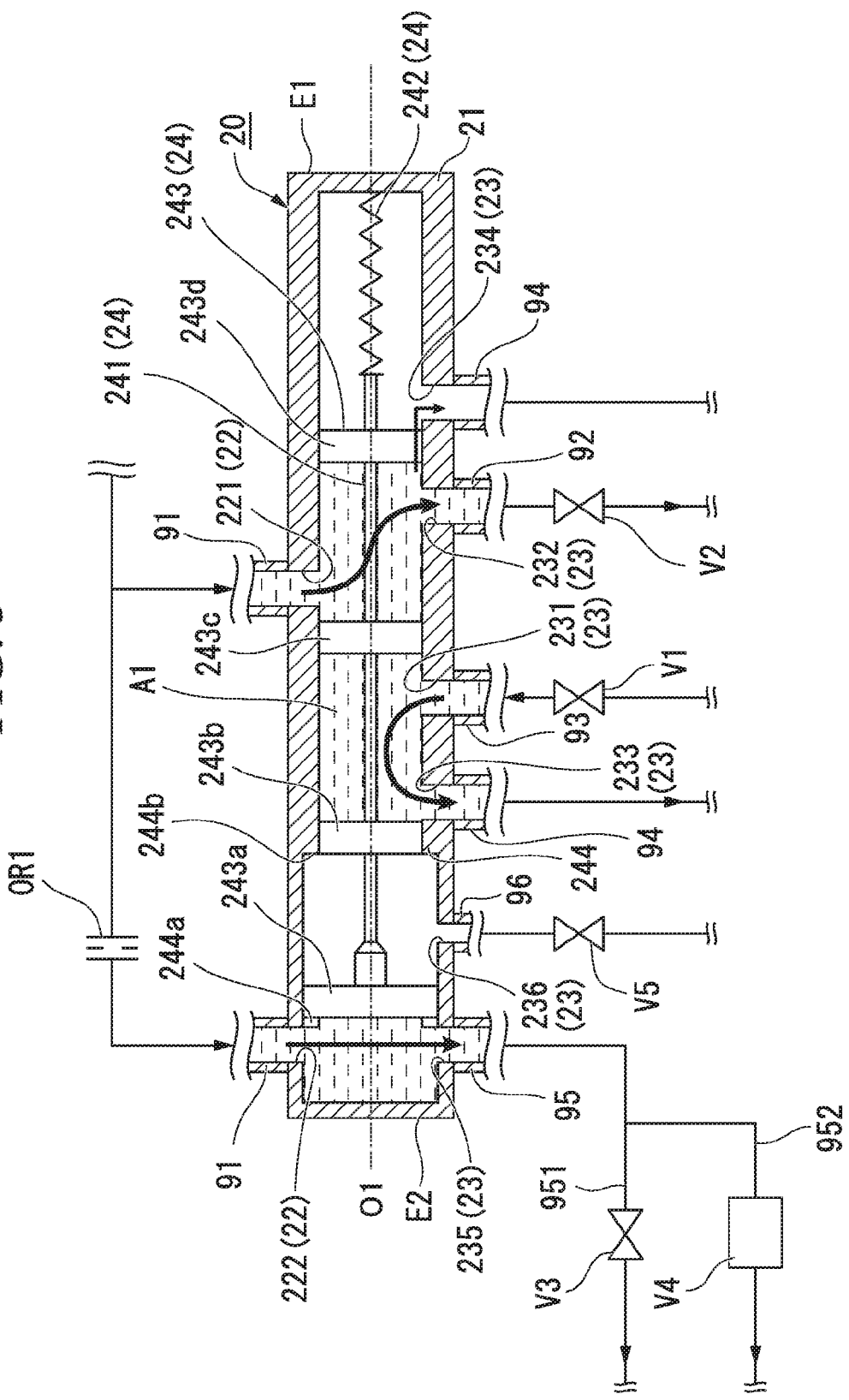
FIG. 3 is a schematic diagram illustrating a mechanical trip device at emergency stop in the embodiment of the present invention.
Figure 4:
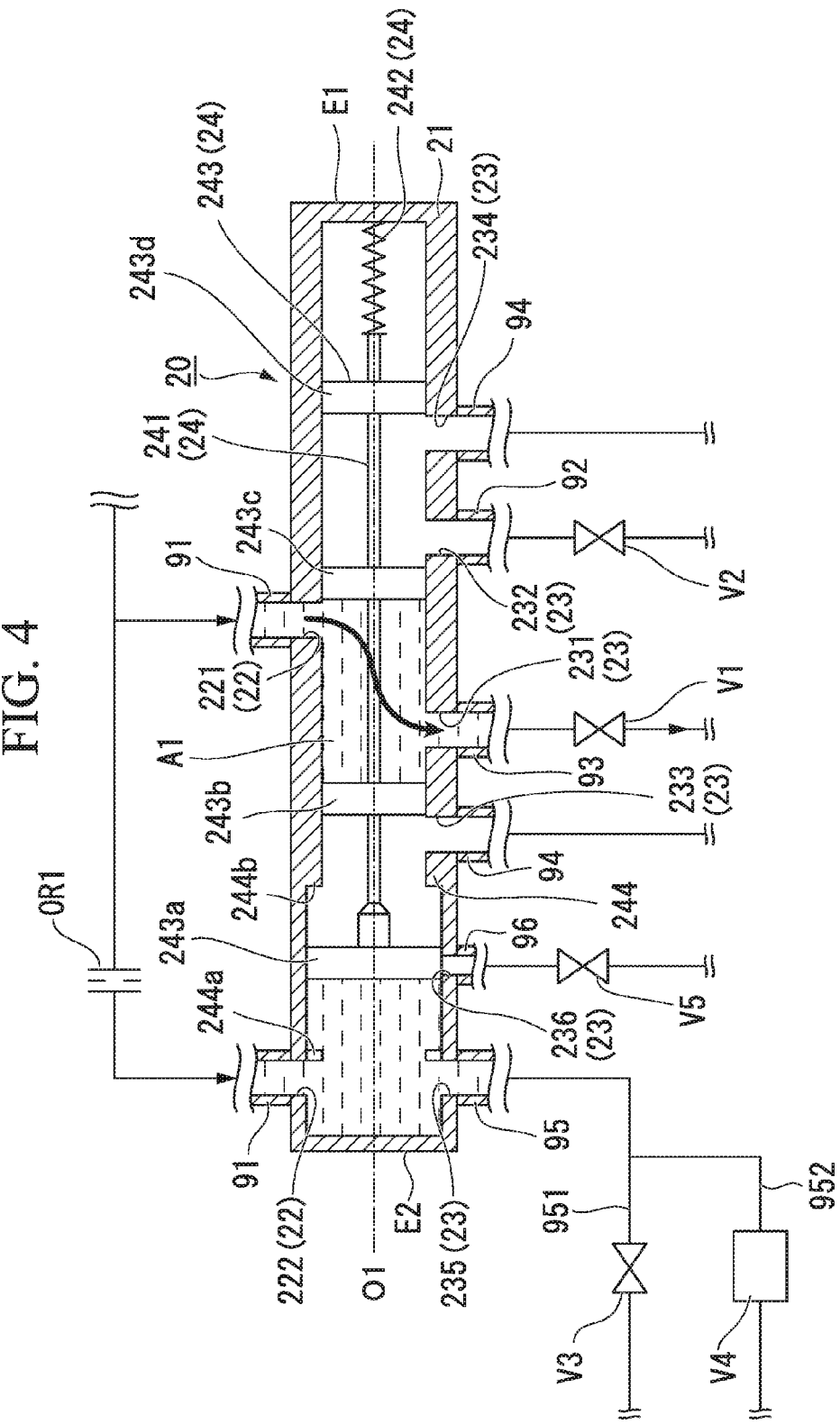
FIG. 4 is a schematic diagram illustrating a mechanical trip device at the time of an operation test in the embodiment of the present invention.
Figure 5:
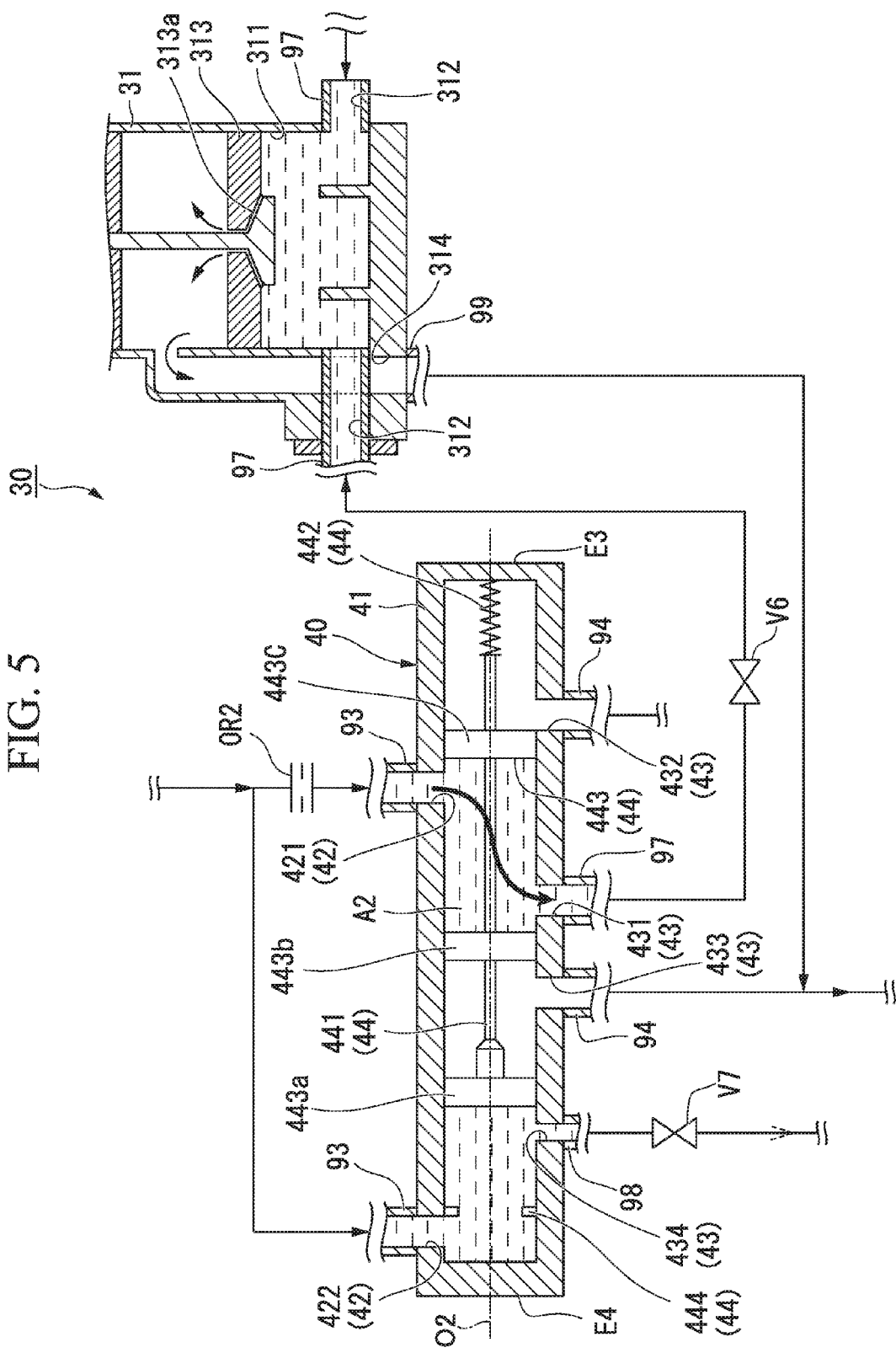
FIG. 5 is a schematic diagram illustrating a trip and throttle valve (TTV) trip device during a normal operation in the embodiment of the present invention.
Figure 6:
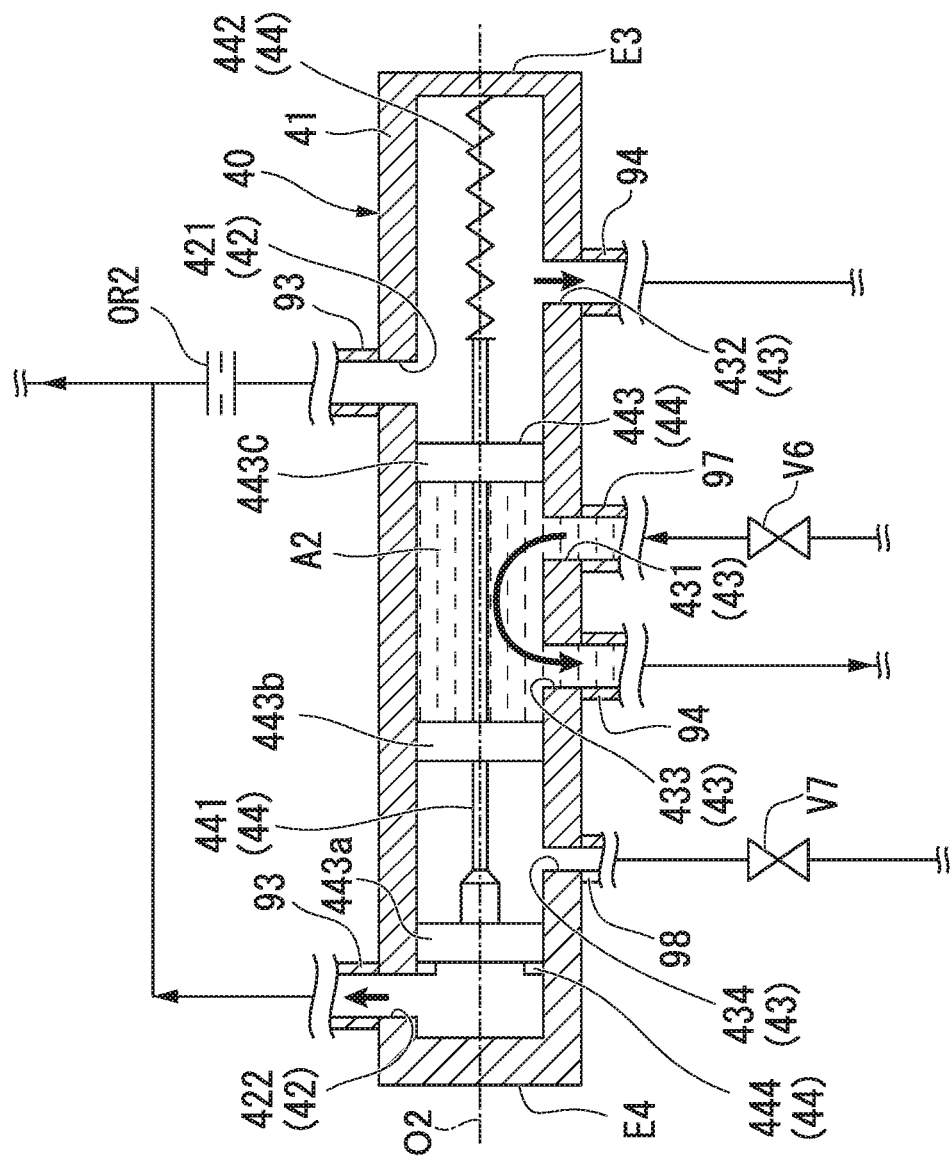
FIG. 6 is a schematic diagram illustrating the TTV trip devices at emergency stop in the embodiment of the present invention.
Figure 7:
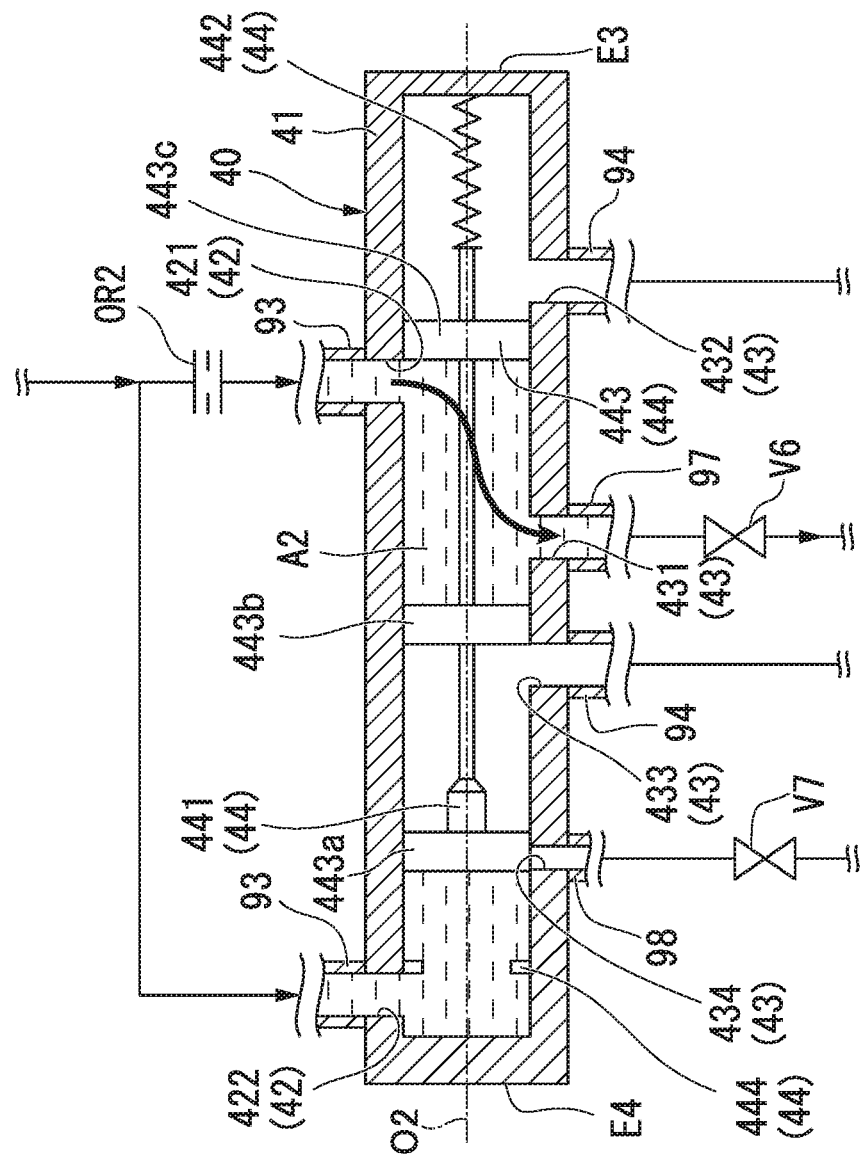
FIG. 7 is a schematic diagram illustrating the TTV trip devices at the time of an operation test in the embodiment of the present invention.

FIG. 1 is a schematic diagram illustrating an emergency shutoff system in an embodiment of the present invention. FIG. 2 is a schematic diagram illustrating a trip device during a normal operation in the embodiment of the present invention. FIG. 3 is a schematic diagram illustrating a mechanical trip device at emergency stop in the embodiment of the present invention. FIG. 4 is a schematic diagram illustrating a mechanical trip device at the time of an operation test in the embodiment of the present invention. FIG. 5 is a schematic diagram illustrating a trip and throttle valve (TTV) trip device during a normal operation in the embodiment of the present invention. FIG. 6 is a schematic diagram illustrating the TTV trip devices at emergency stop in the embodiment of the present invention. FIG. 7 is a schematic diagram illustrating the TTV trip devices at the time of an operation test in the embodiment of the present invention.

An emergency shutoff system 2 urgently shuts off the supply of steam S to a steam turbine 1. In the emergency shutoff system 2 in this embodiment, the state in which steam S is continuously supplied to normally operate the steam turbine 1 is considered to be the state during a normal operation. In the emergency shutoff system 2 in this embodiment, the state in which the supply of steam S is shut off to urgently stop the steam turbine 1 when a rotating body abnormality such as excessive shaft vibrations or a rotor overspeed or a plant machine abnormality occurs and thus the steam turbine 1 and a plant need to be urgently stopped is considered to be the state at emergency stop.

In the steam turbine 1 using the emergency shutoff system 2, a rotor (not illustrated) is rotatably driven through steam S supplied to an upstream side via a stop valve 30 and a regulating valve 10. The steam turbine 1 rotatably drives a driven machine such as a compressor or a generator through rotation of such a rotor.

The emergency shutoff system 2 adjusts a flow of control (drive) oil supplied to various control devices used to control the supply of steam S to the steam turbine 1. As illustrated in FIG. 1, the emergency shutoff system 2 in this embodiment includes the regulating valve 10 (a governing valve: GV) configured to adjust a supply amount of steam S to the steam turbine 1, the stop valve 30 (a main stop valve (MSV) or a trip and throttle valve (TTV)) configured to shut off the supply of steam S to the steam turbine 1 at emergency stop, and a plurality of mechanical trip devices 20 configured to deliver control oil supplied from a supply source (not illustrated) to the stop valve 30. In the emergency shutoff system 2, the regulating valve 10, the stop valve 30, and the mechanical trip devices 20 are connected through a plurality of pipes with control oil circulated therein.

The regulating valve 10 adjusts a degree of valve opening to adjust a supply amount of steam S supplied to an upstream side of the steam turbine 1. The regulating valve 10 adjusts a degree of opening of an oil cylinder thereof operating through the supplied control oil to adjust a degree of valve opening and increases or decreases a supply amount of steam S to adjust an output or a rotational speed. A supply pipe 91 connected to the supply source (not illustrated) of the control oil branches and is connected to the regulating valve 10 in this embodiment. The regulating valve 10 is connected to the plurality of mechanical trip devices 20 via a regulating valve communicating pipe 92 serving as one of the pipes.

During a normal operation, control oil is supplied from the supply source to the regulating valve 10 via the supply pipe 91 serving as one of the pipes. At emergency stop, control oil is supplied from one of the mechanical trip devices 20 to the regulating valve 10 via the regulating valve communicating pipe 92 in addition to the supply pipe 91, is guided in a closed direction of the oil cylinder of the regulating valve 10, and thus the regulating valve 10 is shut off.

The mechanical trip devices 20 are emergency shutoff devices configured to supply control oil to the stop valve 30 and to shut off the supply of control oil to the stop valve 30 at emergency stop. Two mechanical trip devices 20 in this embodiment are arranged in parallel with the regulating valve 10 and the stop valve 30. As illustrated in FIG. 2, one of the mechanical trip devices 20 includes a casing 21 through which control oil flows into a space A1 provided therein and a switching unit 24 configured to switch the circulation state of the control oil in the space A1.

The supply pipe 91 branches and is connected to the two mechanical trip devices 20 arranged in parallel and control oil is supplied from the same supply source of control oil to the two mechanical trip devices 20. The regulating valve communicating pipe 92 connected to the regulating valve 10 branches and is connected to the two mechanical trip devices 20 arranged in parallel and control oil is supplied to the same regulating valve 10 from the two mechanical trip devices 20 at emergency stop. A stop valve communicating pipe 93 connected to the stop valve 30 branches and is connected to the two mechanical trip devices 20 arranged in parallel and control oil is supplied to the same stop valve 30 from the two mechanical trip devices 20. The mechanical trip devices 20 are independently arranged outside of the steam turbine 1 to be able to be operated from the outside.

The casing 21 extends in a rectangular tubular shape about an axis O1. A plurality of inflow ports 22 through which control oil flows into the space A1 formed inside the casing 21 and a plurality of outflow ports 23 through which control oil flows outside of the space A1 are formed in the casing 21 in this embodiment.

Two inflow ports 22 are formed along the axis O1 and to pass through one wall of the casing 21. The inflow ports 22 in this embodiment include a first inflow port 221 to which the supply pipe 91 branches and is connected and a second inflow port 222 to which the supply pipe 91 connected to the first inflow port 221 further branches and is connected.

The first inflow port 221 is formed near a center of the casing 21 than the second inflow port 222.

A supply side orifice OR1 configured to limit a flow rate of control oil flowing in the inside to a predetermined amount is arranged on the connected supply pipe 91 connected to the second inflow port 222. The second inflow port 222 is formed near an end of the casing 21 than the first inflow port 221.

Here, an end portion of the casing 21 on a side at which the second inflow port 222 is not formed with respect to the first inflow port 221 is set to be a first end E1 and an end portion of casing 21 on a side at which the second inflow port 222 is formed with respect to the first inflow port 221 is set to be a second end E2.

A plurality of outflow ports 23 are formed to pass through a wall facing a wall in which the inflow ports 22 are formed across the axis O1 of the casing 21. The outflow ports 23 in this embodiment include a first outflow port 231, a second outflow port 232, a first discharge port 233, a second discharge port 234, a third discharge port 235, and a test outflow port 236.

The first outflow port 231 is connected to the stop valve communicating pipe 93 connected to the stop valve 30. A first outflow valve V1 configured to switch control oil flowing in the inside is installed at the stop valve communicating pipe 93 connected to the first outflow port 231 in order to perform an operation test of an emergency shutoff device. Control oil flowing from the first inflow port 221 into the space A1 flows out to the stop valve communicating pipe 93 through the first outflow port 231 during a normal operation and control oil flowing and coming from the stop valve communicating pipe 93 reversely flows through the first outflow port 231 into the space A1 at emergency stop. The first outflow port 231 is formed at a position near a center of the casing 21 and further shifted toward the second end E2 in an axial direction compared to the first inflow port 221.

An open and closed state of the first outflow valve V1 can be changed by opening the first outflow valve V1 during a normal operation and manually closing the first outflow valve V1 in accordance with necessity such as operation test implementation of the emergency shutoff device.

The second outflow port 232 is connected to the regulating valve communicating pipe 92 connected to the regulating valve 10. A second outflow valve V2 configured to switch control oil flowing in the inside is installed at the regulating valve communicating pipe 92 connected to the second outflow port 232 in order to perform an operation test of the emergency shutoff device. Control oil flowing from the first inflow port 221 into the space A1 flows out to the regulating valve communicating pipe 92 through the second outflow port 232 at emergency stop. The second outflow port 232 is formed at a position near a center of the casing 21 and shifted toward the first end E1, at a side opposite to the first outflow port 231 in the axial direction, across from the first inflow port 221.

An open and closed state of the second outflow valve V2 can be changed by opening the second outflow valve V2 during a normal operation and manually closing the second outflow valve V2 in accordance with necessity such as operation test implementation of the emergency shutoff device.

The first discharge port 233 is connected to one among casing discharge pipes 94 used to discharge control oil outside of the emergency shutoff system 2. Control oil is not circulated through the first discharge port 233 during a normal operation and control oil reversely flowing from the first outflow port 231 into the space A1 is discharged to the casing discharge pipe 94 through the first discharge port 233 at emergency stop. The first discharge port 233 is formed at a position near a center of the casing 21 and closer to the second end E2 side at a position in the axial direction than the first outflow port 231.

The second discharge port 234 is connected to one of the casing discharge pipes 94 configured to discharge control oil to the outside, as with the first discharge port 233. Control oil is not circulated through the second discharge port 234 during a normal operation and at emergency stop. Control oil leaking from the switching unit 24 is discharged through the second discharge port 234. The second discharge port 234 is formed at a position near a center of the casing 21 and closer to the first end E1 side at a position in the axial direction than the second outflow port 232.

The third discharge port 235 is connected to a trip outflow pipe 95 configured to discharge control oil inside the casing 21 at emergency stop to operate the switching unit 24. Control oil is not circulated through the third discharge port 235 during a normal operation and is discharged from the space A1 to a control oil trip outflow pipe 95 through the third discharge port 235 at emergency stop. The third discharge port 235 is formed at a position in the axial direction closer to the second end E2 side than the first discharge port 233 and opposite to the second inflow port 222.

The trip outflow pipe 95 branches to a manual trip outflow pipe 951 at which a manual valve (a manual trip device) V3 is installed and an automatic trip outflow pipe 952 at which a solenoid valve V4 is installed downstream.

The manual valve (the manual trip device) V3 and the solenoid valve V4 are closed during a normal operation. At least one of the manual valve (the manual trip device) V3 and the solenoid valve V4 is opened at emergency stop, and thus control oil is circulated in the trip outflow pipe 95.

The test outflow port 236 is connected to a test outflow pipe 96 configured to check a circulation state of control oil when an operation test is performed. An open and closed state of the test outflow port 236 is switched through the switching unit 24 when an operation test is performed. The test outflow port 236 in this embodiment can be open during a normal operation so that control oil flowing into the space A1 may be discharged through the test outflow port 236. In addition, the test outflow port 236 is closed at the time of an operation test so that control oil is not circulated. The test outflow port 236 is formed on a position closer to the second end E2 side than the first discharge port 233 and sandwiched between the third discharge port 235 and the first discharge port 233.

A test valve V5 used during a partial stroke test of the emergency shutoff device of control oil is installed at the test outflow pipe 96.

The test valve V5 is closed during a normal operation and is opened at the time of an operation test, and control oil is discharged into the test outflow pipe 96 through the test valve V5.

The switching unit 24 slides along an inner circumferential surface of the casing 21 in which the space A1 is formed, changes its position relative to the plurality of outflow ports 23, and thus switches a circulation state of control oil in the space A1. The switching unit 24 in this embodiment includes a shaft 241 extending in the axial direction, a biasing part 242 configured to bias the shaft 241 in the axial direction, a plurality of partition parts 243 fixed to the shaft 241, and a positioning part 244 configured to position the partition parts 243 in the space A1.

The shaft 241 extends in a cylindrical shape about the axis O1 serving as a central axis of the casing 21. The shaft 241 is formed to have a length in which the shaft 241 can be moved in the space A1 in the axial direction.

The biasing part 242 biases the shaft 241 from the first end E1 in the axial direction toward the second end E2. The biasing part 242 is fixed to an inner circumferential surface on the first end E1 side of an inner circumferential surface forming the space A in the casing 21 and an end surface of the shaft 241 on the first end E1 side. Examples of the biasing part 242 include a coil-shaped spring.

The partition parts 243 are formed so that an entire circumference thereof is contact with the inner circumferential surface of the casing 21. In other words, the spaces A1 are partitioned into a plurality of compartments through the partition parts 243. The partition parts 243 are moved together with the shaft 241 in the axial direction. In the partition parts 243 of this embodiment, cross sections of the partition parts 243 perpendicular to the axial direction have a rectangular shape so as to be sliding in contact with the inner circumferential surface of the casing 21. Inside the partition parts 243, the shaft 241 is fixed while being inserting. Four partition parts 243 in this embodiment are installed in the order of a first partition part 243a, a second partition part 243b, a third partition part 243c, and a fourth partition part 243d from the second end E2 side in the axial direction.

The first partition part 243a is fixed to an end surface of the shaft 241 on the second end E2 side. The first partition part 243a is arranged between the test outflow port 236 and the first discharge port 233 during a normal operation. The first partition part 243a is arranged between the third discharge port 235 and the test outflow port 236 at emergency stop. The first partition part 243a is arranged above the test outflow port 236 at the time of an operation test and closes the test outflow port 236.

The second partition part 243b is fixed to the shaft 241 on a position closer to the first end E1 side than the first partition part 243a. The second partition part 243b is arranged between the first discharge port 233 and the first outflow port 231 during a normal operation. The second partition part 243b is arranged between the test outflow port 236 and the first discharge port 233 at emergency stop. At the time of an operation test, the second partition part 243b is arranged between the first discharge port 233 and the first outflow port 231 in a state in which a position thereof is slightly shifted from that during a normal operation.

The third partition part 243c is fixed to the shaft 241 on a position closer to the first end E1 side than the second partition part 243b. The third partition part 243c is arranged between the first inflow port 221 and the second outflow port 232 during a normal operation. The third partition part 243c is arranged between the first outflow port 231 and the first inflow port 221 at emergency stop. At the time of an operation test, the third partition part 243c is arranged between the first inflow port 221 and the second outflow port 232 in a state in which a position thereof is slightly shifted from that during a normal operation.

The fourth partition part 243d is fixed to a position of the shaft 241 which is closer to the first end E1 side than the third partition part 243c and which is closer to the second end E2 side than an end surface of the shaft 241 on the first end E1 side. The fourth partition part 243d is arranged on a position closer to the first end E1 side than the second discharge port 234 during a normal operation. The fourth partition part 243d is arranged between the second outflow port 232 and the second discharge port 234 at emergency stop. At the time of an operation test, the fourth partition part 243d is arranged on a position closer to the first end E1 side than the second discharge port 234 in a state in which a position thereof is slightly shifted from that during a normal operation.

The positioning part 244 restricts movement of the shaft 241 in the space A1. The positioning part 244 in this embodiment includes a first positioning part 244b configured to restrict movement of the shaft 241 to the first end E1 side and a second positioning part 244a configured to restrict movement of the shaft 241 to the second end E2 side.

The first positioning part 244b is formed to protrude inward from the inner circumferential surface of the casing 21 between the test outflow port 236 and the first discharge port 233. The first positioning part 244b in this embodiment comes into contact with a surface of the first partition part 243a facing the first end E1 side to restrict movement of the shaft 241 in the axial direction toward the first end E1 side. The first positioning part 244b is formed to be arranged on a position at which the first partition part 243a does not close the test outflow port 236 during a normal operation.

The second positioning part 244a is formed to protrude inward from the inner circumferential surface of the casing 21 between the third discharge port 235 and the test outflow port 236. The second positioning part 244a in this embodiment comes into contact with a surface of the first partition part 243a facing the second end E2 side to restrict movement of the shaft 241 in the axial direction toward the second end E2 side. The second positioning part 244a is formed to be arranged on a position at which the first partition part 243a does not close the third discharge port 235 and the second inflow port 222 at emergency stop.

The switching unit 24 moves the partition parts 243 used to partition the space A1 in the axial direction along with movement of the shaft 241 as described above to switch a circulation state of control oil in the space A1. In this embodiment, as illustrated in FIG. 2, a circulation state which is a circulation state during a normal operation and in which control oil is circulated from the first inflow port 221 to the first outflow port 231 is set to a first circulation state. As illustrated in FIG. 3, a circulation state which is a circulation state at emergency stop and in which control oil is circulated from the first inflow port 221 to the second outflow port 232 and control oil reversely flowing from the first outflow port 231 is circulated to the first discharge port 233 is set to a second circulation state. As illustrated in FIG. 4, a circulation state which is a circulation state at the time of an operation test and in which an open and closed state of the test outflow port 236 can be switched while control oil is being circulated from the first inflow port 221 to the first outflow port 231 is set to a third circulation state.

The stop valve 30 shuts off steam S to the steam turbine 1 when the supply of control oil from the mechanical trip devices 20 is stopped or reversely flows. The stop valve 30 is set to be an open state in which steam S can be supplied to the steam turbine 1 as control oil is supplied during a normal operation. On the other hand, the stop valve 30 is set to be a closed state in which the supply of steam S to the steam turbine 1 is stopped as control oil is discharged at emergency stop. The stop valve 30 in this embodiment is connected to the mechanical trip devices 20 via the stop valve communicating pipes 93 through which control oil is circulated as illustrated in FIG. 1. As illustrated in FIG. 5, the stop valve 30 in this embodiment includes a stop valve main body 31 and a plurality of TTV trip devices 40 configured to adjust the supply of control oil to the stop valve main body 31.

In the stop valve main body 31, a valve (not illustrated) configured to shut off the supply of steam S to the steam turbine 1 is opened by filling control oil therein and a valve configured to shut off the supply of steam S to the steam turbine 1 is closed by discharging control oil therein. The stop valve main body 31 in this embodiment includes a storing chamber 311 serving as a space inside the oil cylinder of the stop valve main body 31, stop valve inflow ports 312 through which control oil flows into the storing chamber 311, a valve body 313 arranged to partition the storing chamber 311 and sliding along an inside of the storing chamber 311, and a stop valve discharge port 314 through which control oil is discharged from the storing chamber 311.

The storing chamber 311 is formed inside the oil cylinder of the stop valve main body 31 so that supplied control oil is accumulated therein.

Two stop valve inflow ports 312 are formed across from the storing chamber 311. The two stop valve inflow ports 312 are connected to different TTV trip devices 40 respectively.

The valve body 313 can slide along the inside of the storing chamber 311 while partitioning the storing chamber 311. The valve body 313 is moved upward while gradually sliding along the inside of the storing chamber 311 when control oil is accumulated in the storing chamber 311. In the valve body 313, a valve provided on the upstream side of the steam turbine 1 is operated when control oil of a predetermined amount is accumulated in the storing chamber 311 in order to supply steam S to the steam turbine 1. When control oil of a predetermined amount or more is accumulated in the storing chamber 311, the control oil is circulated from a lower side to an upper side of the valve body 313 through a circulating hole 313a formed inside the valve body 313.

The stop valve discharge port 314 communicates with a space closer to an upper side than the valve body 313 of the storing chamber 311. The stop valve discharge port 314 is connected to a stop valve discharge pipe 99. Control oil circulated and coming from a lower side to an upper side of the storing chamber 311 via the circulating hole 313a of the valve body 313 is discharged from the stop valve discharge pipe 99 outside of the stop valve main body 31 through the stop valve discharge port 314. The stop valve discharge pipe 99 is connected to one of the casing discharge pipes 94 of the TTV trip devices 40 which will be described below and control oil circulated in the inside thereof is discharged outside of the emergency shutoff system 2.

The TTV trip devices 40 are emergency shutoff devices configured to adjust circulation of control oil to the stop valve main body 31 to urgently discharge the control oil from an inside of the oil cylinder of the stop valve main body 31. Two TTV trip devices 40 in this embodiment are arranged in parallel with one of the stop valve main bodies 31 as illustrated in FIG. 1. As illustrated in FIG. 5, the TTV trip devices 40 include a TTV casing 41 configured to flow control oil into a TTV space A2 provided therein and a TTV switching unit 44 configured to switch a circulation state of control oil in the TTV space A2.

The stop valve communicating pipes 93 branch and are connected to the two TTV trip devices 40 arranged in parallel and control oil collectively supplied from two mechanical trip devices 20 is distributed again and supplied. The two TTV trip devices 40 arranged in parallel are connected to other internal communicating pipes 97, are connected to different stop valve inflow ports 312, and supply control oil into the storing chamber 311. The TTV trip devices 40 are independently arranged outside of the steam turbine 1 to be able to be operated from the outside.

The TTV casing 41 extends in a rectangular tubular shape using an axis O2 as a center. A plurality of TTV inflow ports 42 through which control oil flows into the TTV space A2 and a plurality of TTV outflow ports 43 through which control oil flows outside of the TTV space A2 are formed in the TTV casing 41.

Two TTV inflow ports 42 are formed in one wall of the TTV casing 41 along a direction in which the axis O2 extends. The TTV inflow ports 42 in this embodiment includes a first TTV inflow port 421 connected to the stop valve communicating pipes 93 and a second TTV inflow port 422 to which one of the stop valve communicating pipes 93 connected to the first TTV inflow port 421 branches and is connected.

A TTV supply side orifice OR2 configured to restrict a flow rate of control oil flowing in the inside to a predetermined amount is arranged at the stop valve communicating pipe 93 connected to the first TTV inflow port 421. The first TTV inflow port 421 is formed near a center of the TTV casing 41.

The second TTV inflow port 422 is formed near an end of the TTV casing 41.

Here, an end portion of the TTV casing 41 on a side at which the second TTV inflow port 422 is not formed with respect to the first TTV inflow port 421 is set to be a TTV first end E3. An end portion of the TTV casing 41 on a side at which the second TTV inflow port 422 is formed with respect to the first TTV inflow port 421 is set to be a TTV second end E4.

A plurality of TTV outflow ports 43 are formed in a wall facing a wall, in which the TTV inflow ports 42 are formed, across the axis O2 of the TTV casing 41. The TTV outflow ports 43 in this embodiment includes a first TTV outflow port 431, a second TTV outflow port 432, a TTV discharge port 433, and a TTV test outflow port 434.

The first TTV outflow port 431 is connected to one of the internal communicating pipes 97 communicating with the storing chamber 311 via the stop valve inflow ports 312. A first TTV outflow valve V6 is installed at the internal communicating pipe 97 connected to the first TTV outflow port 431. Control oil flowing from the first TTV inflow port 421 into the TTV space A2 flows out through the first TTV outflow port 431 during a normal operation. Control oil flowing and coming from the internal communicating pipe 97 reversely flows into the TTV space A2 at emergency stop. The first TTV outflow port 431 is formed on a position near a center of the TTV casing 41 and shifted to be closer to the TTV second end E4 side in the axial direction than the first TTV inflow port 421.

An open and closed state of the first TTV outflow valve V6 can be changed by opening the first TTV outflow valve V6 during a normal operation and manually closing the first TTV outflow valve V6 in accordance with necessity such as an operation test of the TTV trip devices 40.

The second TTV outflow port 432 is connected to the casing discharge pipe 94. Control oil is not circulated through the second TTV outflow port 432 during a normal operation and control oil of the TTV space A2 flows out through the second TTV outflow port 432 at emergency stop. The second TTV outflow port 432 is formed on a position near a center of the TTV casing 41 and shifted toward the TTV first end E3 side serving as a side opposite to the first TTV outflow port 431 in the axial direction across from the first TTV inflow port 421.

The TTV discharge port 433 is connected to the casing discharge pipe 94. Control oil is not circulated through the TTV discharge port 433 during a normal operation and control oil reversely flowing from the first TTV outflow port 431 into the TTV space A2 flows out through the TTV discharge port 433 at emergency stop. The TTV discharge port 433 is formed on a position near a center of the TTV casing 41 and closer to the TTV second end E4 side in the axial direction than the first TTV inflow port 421.

The TTV test outflow port 434 is connected to a TTV test outflow pipe 98 configured to check a circulation state of control oil when an operation test is performed. An open and closed state of the TTV test outflow port 434 is switched by the TTV switching unit 44 when an operation test is performed. The TTV test outflow port 434 in this embodiment is open during a normal operation before an operation test is performed so that control oil flowing into the TTV space A2 can be discharged and is closed at the time of an operation test so that control oil is not circulated. The TTV test outflow port 434 is formed to be closer to the TTV second end E4 side than the TTV discharge port 433.

A TTV test valve V7 of control oil is installed at the TTV test outflow pipe 98. The TTV test valve V7 is closed during a normal operation. The TTV test valve V7 is opened at the time of an operation test, and thus control oil is circulated in the TTV test outflow pipe 98.

The TTV switching unit 44 slides along an inner circumferential surface of the TTV casing 41 in which the TTV space A2 is formed, changes its position relative to the plurality of outflow ports 23, and thus switches a circulation state of control oil in the TTV space A2. The TTV switching unit 44 in this embodiment includes a TTV shaft 441 extending in the axial direction, a TTV biasing part 442 configured to bias the TTV shaft 441 in the axial direction, a plurality of TTV partition parts 443 fixed to the TTV shaft 441, and a TTV positioning part 444 configured to determine positions of the TTV partition parts 443 in the TTV space A2.

The TTV shaft 441 extends in a cylindrical shape about the axis O2 serving as a central axis of the TTV casing 41. The TTV shaft 441 is formed to have a length in which the TTV shaft 441 can be moved in the TTV space A2 in the axial direction.

The TTV biasing part 442 biases the TTV shaft 441 from the TTV first end E3 toward the TTV second end E4 in the axial direction. The TTV biasing part 442 is fixed to an inner circumferential surface on the TTV first end E3 side of an inner circumferential surface forming the TTV space A2 in the TTV casing 41 and an end surface of the TTV shaft 441 on the TTV first end E3 side. Examples of the TTV biasing part 442 include a coil-shaped spring.

The TTV partition parts 443 are formed so that an entire circumference thereof is contact with the inner circumferential surface of the TTV casing 41. In other words, the TTV partition parts 443 partition the TTV space A2 into a plurality of compartments. The TTV partition parts 443 are moved in the axial direction together with the TTV shaft 441. In the TTV partition parts 443 in this embodiment, cross sections of the TTV partition parts 443 perpendicular to the axial direction have rectangular shapes so as to be sliding in contact with the inner circumferential surface of the TTV casing 41. Inside the TTV partition parts 443, the TTV shaft 441 is fixed while being inserting. Three TTV partition parts 443 in this embodiment are installed in the order of a first TTV partition part 443a, a second TTV partition part 443b, and a third TTV partition part 443c from the TTV second end E4 side in the axial direction.

The first TTV partition part 443a is fixed to an end surface of the TTV shaft 441 on the TTV second end E4 side. The first TTV partition part 443a is arranged between the TTV test outflow port 434 and the TTV discharge port 433 during a normal operation. The first TTV partition part 443a is arranged to be closer to the TTV second end E4 side than the TTV test outflow port 434 at emergency stop. The first TTV partition part 443a is arranged on the TTV test outflow port 434 and closes the TTV test outflow port 434 at the time of an operation test.

The second TTV partition part 443b is fixed to the TTV shaft 441 on a position closer to the TTV first end E3 side than the first TTV partition part 443a. The second TTV partition part 443b is arranged between the TTV discharge port 433 and the first TTV outflow port 431 during a normal operation. The second TTV partition part 443b is arranged between the TTV test outflow port 434 and the TTV discharge port 433 at emergency stop. At the time of an operation test, the second TTV partition part 443b is arranged between the TTV discharge port 433 and the first TTV outflow port 431 in a state in which a position thereof is slightly shifted from that during a normal operation.

The third TTV partition part 443c is fixed to the TTV shaft 441 on a position closer to the TTV first end E3 side than the second TTV partition part 443b and closer to the TTV second end E4 side than an end surface of the TTV shaft 441 on the TTV first end E3 side. The third TTV partition part 443c is arranged between the first TTV inflow port 421 and the second TTV outflow port 432 during a normal operation. The third TTV partition part 443c is arranged between the first TTV outflow port 431 and the first TTV inflow port 421 at emergency stop. At the time of an operation test, the third TTV partition part 443c is arranged between the first TTV inflow port 421 and the second TTV outflow port 432 in a state in which the position thereof is slightly shifted from that during a normal operation.

The TTV positioning part 444 restricts movement of the TTV shaft 441 in the TTV space A2. The TTV positioning part 444 in this embodiment restricts movement of the TTV shaft 441 to the TTV second end E4 side. The TTV positioning part 444 is formed to protrude inward from the inner circumferential surface of the casing 21 between the second TTV inflow port 422 and the TTV test outflow port 434. The TTV positioning part 444 in this embodiment comes into contact with a surface of the first TTV partition part 443a facing the TTV second end E4 side to restrict movement of the TTV shaft 441 to the TTV second end E4 side in the axial direction. The TTV positioning part 444 is formed to be arranged on a position, at which the first TTV partition part 443a does not close the second TTV inflow port 422, at emergency stop.

In the TTV switching unit 44, the TTV partition parts 443 are moved in the axial direction along with movement of the TTV shaft 441 as described above so that a circulation state of control oil in the TTV space A2 is switched. In this embodiment, as illustrated in FIG. 5, a circulation state which is a circulation state during a normal operation and in which control oil is circulated from the first TTV inflow port 421 to the first TTV outflow port 431 is set to be a first TTV circulation state. As illustrated in FIG. 6, a circulation state which is a circulation state at emergency stop and in which control oil is circulated from the first TTV inflow port 421 to the second TTV outflow port 432 and control oil reversely flowing from the first TTV outflow port 431 is circulated to the TTV discharge port 433 is set to be a second TTV circulation state. As illustrated in FIG. 7, a circulation state which is a circulation state at the time of an operation test and in which an open and closed state of the TTV test outflow port 434 is switched while control oil is circulated from the first TTV inflow port 421 to the first TTV outflow port 431 is set to be a third TTV circulation state.

Next, an operation of the emergency shutoff system 2 with the above-described constitution will be described.

In the above-described emergency shutoff system 2, control oil is supplied from the supply source to the regulating valve 10 and the mechanical trip devices 20 via the supply pipe 91 so that an open state in which steam S can be supplied to the steam turbine 1 is set during a normal operation.

The regulating valve 10 is supplied with control oil so that the degree of valve opening is adjusted and steam S is supplied to the steam turbine 1.

Since the mechanical trip device 20 is during a normal operation, a circulation state of control oil in the space A1 is switched to the first circulation state using the switching unit 24. In other words, as illustrated in FIG. 2, in the mechanical trip devices 20 during a normal operation, as the first circulation state, the first partition part 243a is arranged between the first discharge port 233 and the test outflow port 236, the second partition part 243b is arranged between the first discharge port 233 and the first outflow port 231, the third partition part 243c is arranged between the first inflow port 221 and the second outflow port 232, and the fourth partition part 243d is arranged to be closer to the first end E1 side than the second discharge port 234.

Also, control oil supplied from the supply pipes 91 to the mechanical trip device 20 flows from the first inflow port 221 into the space A1. Control oil flowing into the space A1 through the first inflow port 221 is delivered to the stop valve communicating pipes 93 through the first outflow port 231. Since the first outflow valve V1 is open during a normal operation, control oil flowing into the stop valve communicating pipes 93 is delivered to the stop valve 30.

Control oil supplied from the supply pipe 91 to the mechanical trip device 20 also flows from the second inflow port 222 into the space A1 while a flow rate thereof is restricted through the supply side orifice OR1. Control oil flowing from the second inflow port 222 into the space A1 flows from the third discharge port 235 to the trip outflow pipe 95 and flows from the test outflow port 236 to the test outflow pipe 96. Here, since the manual valve (the manual trip device) V3 and the solenoid valve V4 are closed during a normal operation, the control oil is not circulated in the trip outflow pipe 95. Similarly, since the test valve V5 is closed during a normal operation, control oil is not circulated in the test outflow pipe 96. As a result, the control oil stays in the space A1 between the second inflow port 222, and the third discharge port 235 and the test outflow port 236. The staying control oil presses the first partition part 243a toward the first end E1 side in the axial direction against the biasing force of the biasing part 242. As a result, the position of the shaft 241 during a normal operation is maintained to be the first circulation state by the staying control oil.

Control oil flowing from the stop valve communicating pipe 93 to the stop valve 30 is supplied from the internal communicating pipes 97 to the stop valve main body 31 via the TTV trip device 40.

Since the TTV trip device 40 is during a normal operation, a circulation state of control oil in the TTV space A2 is switched to the first TTV circulation state through the TTV switching unit 44. In other words, as illustrated in FIG. 5, in the TTV trip device 40 during a normal operation, as the first TTV circulation state, the first TTV partition part 443a is arranged between the TTV test outflow port 434 and the TTV discharge port 433, the second TTV partition part 443b is arranged between the TTV discharge port 433 and the first TTV outflow port 431, and the third TTV partition part 443c is arranged between the first TTV inflow port 421 and the second TTV outflow port 432.

Therefore, control oil supplied from the stop valve communicating pipe 93 to the TTV trip device 40 flows into the TTV space A2 through the first TTV inflow port 421 while a flow rate thereof is restricted through the TTV supply side orifice OR2. The control oil flowing into the TTV space A2 through the first TTV inflow port 421 is delivered to the internal communicating pipes 97 through the first TTV outflow port 431. Since the first TTV outflow valve V6 is open during a normal operation, control oil flowing into the internal communicating pipes 97 is delivered to the stop valve main body 31.

The control oil supplied to the stop valve main body 31 flows into the storing chamber 311 through the stop valve inflow ports 312. Control oil of a predetermined amount is accumulated in the storing chamber 311, the valve body 313 is move upward, the stop valve 30 is set to be an open state, and thus steam S can be supplied to the steam turbine 1. After the valve body 313 has been moved upward, control oil flowing into the storing chamber 311 is circulated from a lower side toward an upper side of the valve body 313 via an inflow hole. Thus, control oil of more than a predetermined amount is discharged outside of the stop valve main body 31 from the stop valve discharge port 314. The control oil discharged from the stop valve discharge port 314 is discharged outside of the emergency shutoff system 2 from the stop valve discharge pipe 99 via the casing discharge pipe 94.

Control oil supplied from the stop valve communicating pipe 93 to the TTV trip device 40 also flows from the second TTV inflow port 422 into the TTV space A2. The control oil flowing into the TTV space A2 through the second TTV inflow port 422 flows into the TTV test outflow pipe 98 through the TTV test outflow port 434. Here, since the TTV test valve V7 is closed during a normal operation, the control oil is not circulated in the TTV test outflow pipe 98. As a result, the control oil stays in the TTV space A2 between the second TTV inflow port 422 and the TTV test outflow port 434. The staying control oil presses the first TTV partition part 443a toward the TTV first end E3 side in the axial direction against the biasing force of the TTV biasing part 442. As a result, the position of the TTV shaft 441 during a normal operation is maintained to be the first TTV circulation state by the staying control oil.

In the emergency shutoff system 2 in this embodiment, control oil is discharged from the storing chamber 311 in order to discharge control oil in the stop valve main body 31 and set the stop valve 30 into closed state at emergency stop in which the steam turbine 1 is urgently stopped when abnormality such as excessive shaft vibrations of the steam turbine 1 occurs.

To be specific, in the emergency shutoff system 2 in this embodiment, at least one of the manual valve (the manual trip device) V3 and the solenoid valve V4 is opened at emergency stop. Thus, control oil in the trip outflow pipe 95 is circulated and control oil in the space A1 is discharged through the third discharge port 235. Since the flow rate of control oil flowing from the supply pipe 91 into the second inflow port 222 is restricted through the supply side orifice OR1, a flow rate of control oil discharged through the third discharge port 235 is more than the inflow flow rate. For this reason, an amount of control oil on a position in the space A1 closer to the second end E2 side than the first partition part 243a is reduced. Therefore, as illustrated in FIG. 3, a force of pressing the first partition part 243a toward the first end E1 side in the axial direction is reduced and thus the shaft 241 is moved up to a position at which the first partition part 243a comes into contact with the second positioning part 244a due to a biasing force of the biasing part 242. As a result, in the mechanical trip device 20, a circulation state of the control oil in the space A1 is switched from the first circulation state to the second circulation state.

When the circulation state is switched to the second circulation state, in the mechanical trip devices 20 at emergency stop, the first partition part 243a is arranged between the third discharge port 235 and the test outflow port 236, the second partition part 243b is arranged between the test outflow port 236 and the first discharge port 233, the third partition part 243c is arranged between the first outflow port 231 and the first inflow port 221, and the fourth partition part 243d is arranged between the second outflow port 232 and the second discharge port 234.

In the second circulation state, control oil flowing into the space A1 through the first inflow port 221 is delivered to the regulating valve communicating pipe 92 through the second outflow port 232. Therefore, control oil directly supplied from the supply source via the supply pipe 91 and control oil supplied from the mechanical trip device 20 via the regulating valve communicating pipe 92 flows into the regulating valve 10. The regulating valve 10 is closed so that control oil flowing in via the regulating valve communicating pipe 92 is guided in a closed direction of the oil cylinder of the regulating valve 10 to stop the supply of steam S to the steam turbine 1.

Simultaneously, in the second circulation state, the first outflow port 231 communicates with the first discharge port 233 through the space A1. Thus, control oil circulated through the stop valve communicating pipe 93 reversely flows, flows into the space A1 through the first outflow port 231, and is discharged to the outside via the casing discharge pipe 94 through the first discharge port 233.

When the control oil circulated through the stop valve communicating pipes 93 reversely flows, control oil in the TTV space A2 on a position closer to the TTV second end E4 side than the first TTV partition part 443a of the TTV trip device 40 flows out to the stop valve communicating pipe 93 through the second TTV inflow port 422. Thus, an amount of control oil in the TTV space A2 between an inner circumferential surface in the TTV space A2 on the TTV second end E4 side and the first TTV partition part 443a is reduced. Therefore, as illustrated in FIG. 6, a force of pressing the first TTV partition part 443a toward the TTV first end E3 side in the axial direction is reduced and thus the TTV shaft 441 is moved up to a position at which the first TTV partition part 443a comes into contact with the TTV positioning part 444 due to a biasing force of the TTV biasing part 442. As a result, in the TTV trip device 40, a circulation state of the control oil in the TTV space A2 is switched from the first TTV circulation state to a second TTV circulation state.

When the circulation state is switched to the second TTV circulation state, in the TTV trip device 40 at emergency stop, the first TTV partition part 443a is arranged on a position closer to the TTV second end E4 side than the TTV test outflow port 434, the second TTV partition part 443b is arranged between the TTV test outflow port 434 and the TTV discharge port 433, and the third TTV partition part 443c is arranged between the first TTV outflow port 431 and the First TTV inflow port 421.

The first TTV inflow port 421 is connected to the stop valve communicating pipes 93 via the TTV supply side orifice OR2. For this reason, in the second TTV circulation state, control oil on a position in the TTV space A2 closer to the TTV first end E3 side than the third TTV partition part 443c is discharged from the second TTV outflow port 432 to the outside via the casing discharge pipes 94 instead of the first TTV inflow port 421.

Simultaneously, in the second TTV circulation state, the first TTV outflow port 431 communicates with the TTV discharge port 433. Thus, control oil circulated through the internal communicating pipes 97 reversely flows, flows from the first TTV outflow port 431 into the TTV space A2, and discharged from the TTV discharge port 433 to the outside via the casing discharge pipes 94. In addition, when control oil circulated through the internal communicating pipe 97 reversely flows, control oil accumulated in the storing chamber 311 of the stop valve main body 31 flows out from the stop valve inflow ports 312 to the internal communicating pipes 97. Control oil flowing out from the stop valve inflow ports 312 to the internal communicating pipes 97 is also discharged from the TTV discharge port 433 to the outside via the casing discharge pipe 94. As a result, control oil in the storing chamber 311 is discharged and thus the valve body 313 is moved toward a lower side. Thus, the stop valve 30 is in a closed state and the supply of steam S to the steam turbine 1 is shut off.

Also, in the emergency shutoff system 2 in this embodiment, an operation test used to check whether the switching unit 24 or the TTV switching unit 44 correctly operates is regularly performed on the mechanical trip device 20 or the TTV trip device 40 during a normal operation.

When an operation test is performed in the mechanical trip device 20, the test valve V5 used at the time of a partial stroke test in the emergency shutoff device is opened during a normal operation. When the test valve V5 is opened, control oil can be circulated in the test outflow pipe 96. As a result, as illustrated in FIG. 2, when the circulation state is in the first circulation state, control oil flows out from the space A1 via the test outflow port 236. Thus, it is checked whether the first partition part 243a is in the first circulation state in advance before an operation test starts.

In this state, in the mechanical trip device 20, a circulation state of control oil in the space A1 is switched from the first circulation state to the third circulation state through the switching unit 24 for the purpose of an operation test. Thus, as illustrated in FIG. 4, in the mechanical trip device 20, as the third circulation state, the first partition part 243a is arranged on the test outflow port 236, the second partition part 243b is arranged between the first discharge port 233 and the first outflow port 231, the third partition part 243c is arranged between the first inflow port 221 and the second outflow port 232, and the fourth partition part 243d is arranged on a position closer to the first end E1 than the second discharge port 234.

When the shaft 241 is normally moved so that the first partition part 243a is moved to a position at which the first partition part 243a closes the test outflow port 236, an outflow of control oil from the test outflow pipe 96 is reduced. On the other hand, when the shaft 241 is not moved so that the first partition part 243a is not moved to a position at which the first partition part 243a closes the test outflow port 236, control oil continues to flow out from the test outflow pipe 96. Therefore, it can be determined whether the switching unit 24 normally operates and a circulation state can be switched from the first circulation state to the third circulation state in accordance with whether an outflow of control oil from the test outflow pipe 96 is reduced.

When an operation test is performed in the TTV trip device 40, the TTV test valve V7 is opened during a normal operation. When the TTV test valve V7 is opened, control oil can be circulated in the TTV test outflow pipe 98. As a result, as illustrated in FIG. 5, when the circulation state is in the first TTV circulation state, control oil flows out from the TTV space A2 via the TTV test outflow port 434. Thus, it is checked whether the first TTV partition part 443a is in the first TTV circulation state in advance before an operation test starts.

In this state, in the TTV trip device 40, a circulation state of control oil in the TTV space A2 is switched from the first TTV circulation state to a third TTV circulation state using the TTV switching unit 44 for the purpose of an operation test. Thus, as illustrated in FIG. 7, in the TTV trip device 40, as the third TTV circulation state, the first TTV partition part 443a is arranged on the test outflow port 236, the second TTV partition part 443b is arranged between the TTV discharge port 433 and the first TTV outflow port 431, and the third TTV partition part 443c is arranged between the first TTV inflow port 421 and the second TTV outflow port 432.

When the TTV shaft 441 is normally moved so that the first TTV partition part 443a is moved to a position at which the first TTV partition part 443a closes the TTV test outflow port 434, an outflow of control oil from the TTV test outflow pipe 98 is reduced. On the other hand, when the TTV shaft 441 is not moved so that the first TTV partition part 443a is not moved to a position at which the first TTV partition part 443a closes the TTV test outflow port 434, control oil continues to flow out from the TTV test outflow pipe 98. Therefore, it can be determined whether the TTV switching unit 44 normally operates and a circulation state can be switched from the first TTV circulation state to the third TTV circulation state in accordance with whether an outflow of control oil from the TTV test outflow pipe 98 is reduced.

According to the above-described mechanical trip device 20, when an operation test is performed, a circulation state is switched from the first circulation state to the third circulation state through the switching unit 24 so that an open test outflow port 236 is closed and an open and closed state can be switched. Since control oil is circulated from the first inflow port 221 to the first outflow port 231 in the casing 21 even when a circulation state is switched from the first circulation state to the third circulation state, a circulation state of control oil in the space A1 can be maintained.

Therefore, an operation test can be easily performed while a circulation state during a normal operation is maintained without stopping the steam turbine 1.

Similarly, according to the TTV trip device 40, when an operation test is performed, since control oil is circulated from the first TTV inflow port 421 to the first TTV outflow port 431 in the TTV casing 41 even when a circulation state is switched from the first TTV circulation state to the third TTV circulation state, a circulation state of control oil in the TTV space A2 can be maintained. Therefore, an operation test can be easily performed while a circulation state during a normal operation is maintained without stopping the steam turbine 1.

The first outflow port 231 is connected to the stop valve communicating pipes 93 connected to the stop valve 30 and the second outflow port 232 is connected to the regulating valve communicating pipe 92 connected to the regulating valve 10 so that they can be used as the mechanical trip device 20 serving as an emergency shutoff device configured to urgently shut off the stop valve 30 or the regulating valve 10 when the steam turbine 1 is urgently stopped. The mechanical trip device 20 in this embodiment can easily perform an operation test while a circulation state during a normal operation is maintained and thus adhesion of the shaft 241 or the partition parts 243 to the casing 21 can be suppressed. Thus, the reliability of an operation at emergency stop as the mechanical trip device 20 can be improved.

The first TTV outflow port 431 is connected to the internal communicating pipe 97 communicating with the storing chamber 311 and the second TTV outflow port 432 is connected to the casing discharge pipe 94 so that they can be used as the TTV trip device 40 serving as an emergency shutoff device configured to urgently perform discharge from the storing chamber 311. The TTV trip device 40 in this embodiment can easily perform an operation test while a circulation state during a normal operation is maintained and thus adhesion of the TTV shaft 441 or the TTV partition parts 443 to the TTV casing 41 can be suppressed. Thus, the reliability of an operation at emergency stop as the TTV trip device 40 can be improved.

The mechanical trip device 20 and the TTV trip device 40 are independently arranged on the outside of the steam turbine 1 and thus the shaft 241 or the TTV shaft 441 can be easily moved by operating the shaft from the outside regardless of an operation situation of the steam turbine 1 when an operation test is performed.

In the emergency shutoff system 2 in this embodiment, the emergency shutoff system 2 can be easily constituted using the mechanical trip device 20 in which the casing 21 is formed in a simple structure in which the switching unit 24 constituted of the shaft 241, the partition parts 243, and the like is merely switched. Similarly, in the emergency shutoff system 2, the emergency shutoff system 2 can be easily constituted using the TTV trip device 40 in which the TTV casing 41 is formed in a simple structure in which the TTV switching unit 44 constituted of the TTV shaft 441, the TTV partition parts 443, and the like is merely switched.

The two mechanical trip devices 20 and the two TTV trip devices 40 are arranged in parallel so that redundancy can be provided. For this reason, even when any one of the mechanical trip devices 20 and the TTV trip devices 40 has failed, an open and closed state of the first outflow valve V1 or the second outflow valve V2 is switched so that control oil can be supplied via any of the mechanical trip devices 20 and the TTV trip devices 40 which has not failed. Furthermore, a turbine can be tripped via an emergency shutoff device which has not failed in an emergency. Thus, the steam turbine 1 can be stably operated without stopping the steam turbine 1 due to a failure of the emergency shutoff system.

Control oil is discharged through the two stop valve inflow ports 312 installed at the storing chamber 311 and the two mechanical trip devices 20 and the two TTV trip devices 40 at emergency stop. Thus, control oil accumulated in the storing chamber 311 can be quickly discharged and the steam turbine 1 can be rapidly and urgently stopped.

Although the embodiments of the present invention have been described in detail above with reference to the drawings, constitutions and combinations thereof in the embodiments are merely examples, and additions, omissions, substitutions, and other modifications of the constitutions are possible without departing from the gist of the present invention. Furthermore, the present invention is not limited to the embodiments, and is only limited by the appended claims.

Note that, although the two mechanical trip devices 20 and the two TTV trip devices 40 are arranged in parallel in this embodiment, the numbers of mechanical trip devices 20 and TTV trip devices 40 are not limited to two. For example, three or more mechanical trip devices 20 and TTV trip devices 40 may be arranged and only one mechanical trip device 20 and TTV trip device 40 may be arranged.

Shapes of the casing 21 of the mechanical trip device 20 and the TTV casing 41 of the TTV trip device 40 are not limited to rectangular tubular shapes and may have other shapes. For example, the casing 21 and the TTV casing 41 may have a cylindrical shape.

INDUSTRIAL APPLICABILITY

According to the above-described emergency shutoff device, an operation test can be easily performed by switching a circulation state to the third circulation state through the switching unit 24 and by switching an open and closed state of the test outflow port 236 while control oil is being circulated from the inflow ports 22 to the first outflow port 231.

REFERENCE SIGNS LIST

1 Steam turbine
S Steam
2 Emergency shutoff system
10 Regulating valve
20 Mechanical trip device
21 Casing
O1 Axis
A1 Space
22 Inflow port
221 First inflow port
222 Second inflow port
OR1 Supply side orifice
E1 First end
E2 Second end
23 Outflow port
231 First outflow port
232 Second outflow port
233 First discharge port
234 Second discharge port
235 Third discharge port
236 Test outflow port
24 Switching unit
241 Shaft
242 Biasing part 243 Partition part
243a First partition part
243b Second partition part
243c Third partition part
243d Fourth partition part
244 Positioning part
244a Second positioning part
244b First positioning part
30 Stop valve
31 Stop valve main body
311 Storing chamber
312 Stop valve inflow port
313 Valve body
313a Circulating hole
314 Stop valve discharge port
40 TTV trip device
41 TTV casing
O2 Axis
A2 TTV space
42 TTV inflow port
421 First TTV inflow port
422 Second TTV inflow port
OR2 TTV supply side orifice
E3 TTV first end
E4 TTV second end
43 TTV outflow port
431 First TTV outflow port
432 Second TTV outflow port
433 TTV discharge port
434 TTV test outflow port
44 TTV switching unit
441 TTV shaft
442 TTV biasing part
443 TTV partition part
443a First TTV partition part
443b Second TTV partition part
443c Third TTV partition part
444 TTV positioning part
91 Supply pipe
92 Regulating valve communicating pipe
93 Stop valve communicating pipe
94 Casing discharge pipe
95 Trip outflow pipe
951 Manual trip outflow pipe
952 Automatic trip outflow pipe
96 Test outflow pipe
97 Internal communicating pipe
98 TTV test outflow pipe
99 Stop valve discharge pipe
V1 First outflow valve
V2 Second outflow valve
V3 Manual valve (manual trip device)
V4 Solenoid valve
V5 Test valve
V6 First TTV outflow valve
V7 TTV test valve

What is claimed is:

1. An emergency shutoff device comprising:
a casing in which an inflow port through which control oil flows into a space provided therein and a plurality of outflow ports through which the control oil flows outside of the space are formed; and
a switching unit configured to slide along an inner circumferential surface of the casing in which the space is formed, to change its position relative to the plurality of outflow ports, and thus to switch a circulation state of the control oil in the space,
wherein the casing includes, as the plurality of outflow ports,
a first outflow port through which the control oil flowing into the space through the inflow port flows out and the control oil reversely flows into the space,
a second outflow port through which the control oil flowing into the space through the inflow port flows out,
a discharge port through which the control oil reversely flowing into the space through the first outflow port is discharged, and
a test outflow port, an open and closed state of which is switched through the switching unit when an operation test is performed, and
wherein the switching unit switches the circulation state between
a first circulation state in which the control oil is circulated from the inflow port to the first outflow port,
a second circulation state in which the control oil is circulated from the inflow port to the second outflow port and the control oil reversely flowing from the first outflow port is circulated to the discharge port, and
a third circulation state in which the open and closed state of the test outflow port is switched while the control oil is being circulated from the inflow port to the first outflow port.

2. The emergency shutoff device according to claim 1, wherein the first outflow port is connected to a stop valve communicating pipe connected to a stop valve configured to shut off a supply of steam to a steam turbine by discharging the control oil filling an inside thereof,
the second outflow port is connected to a regulating valve communicating pipe connected to a regulating valve configured to adjust a supply amount of steam to the steam turbine, and
the discharge port is connected to a casing discharge pipe configured to discharge the control oil in the space to the outside, and
wherein the switching unit is switched from the first circulation state to the second circulation state when the steam turbine is urgently stopped and is switched from the first circulation state to the third circulation state when an operation test is performed.

3. The emergency shutoff device according to claim 1, wherein the first outflow port is connected to an internal communicating pipe communicating with an inside of an oil cylinder of a stop valve configured to shut off a supply of steam to a steam turbine by discharging the control oil filling an inside thereof,
the second outflow port is connected to a casing discharge pipe through which the control oil in the space is discharged to the outside, and
the discharge port is connected to a stop valve discharge pipe through which the control oil inside the oil cylinder of the stop valve is discharged to the outside, and
wherein the switching unit is switched from the first circulation state to the second circulation state when the steam turbine is urgently stopped and is switched from the first circulation state to the third circulation state when an operation test is performed.

4. An emergency shutoff system comprising:
a stop valve configured to shut off the supply of steam to a steam turbine by discharging a control oil filling an inside thereof;
a regulating valve configured to adjust a supply amount of steam to the steam turbine; and
the emergency shutoff device according to claim 2.

5. An emergency shutoff system comprising:
a stop valve configured to shut off the supply of steam to a steam turbine by discharging a control oil filling an inside thereof;
a regulating valve configured to adjust a supply amount of steam to the steam turbine; and
the emergency shutoff device according to claim 3.

6. The emergency shutoff system according to claim 4, wherein a plurality of emergency shutoff devices are arranged in parallel.

7. The emergency shutoff system according to claim 5, wherein a plurality of emergency shutoff devices are arranged in parallel.

* * * * *